Nov. 17, 1931.    A. C. McNULTY    1,832,315
SUPPORTING DEVICE
Filed Oct. 25, 1930    2 Sheets-Sheet 1
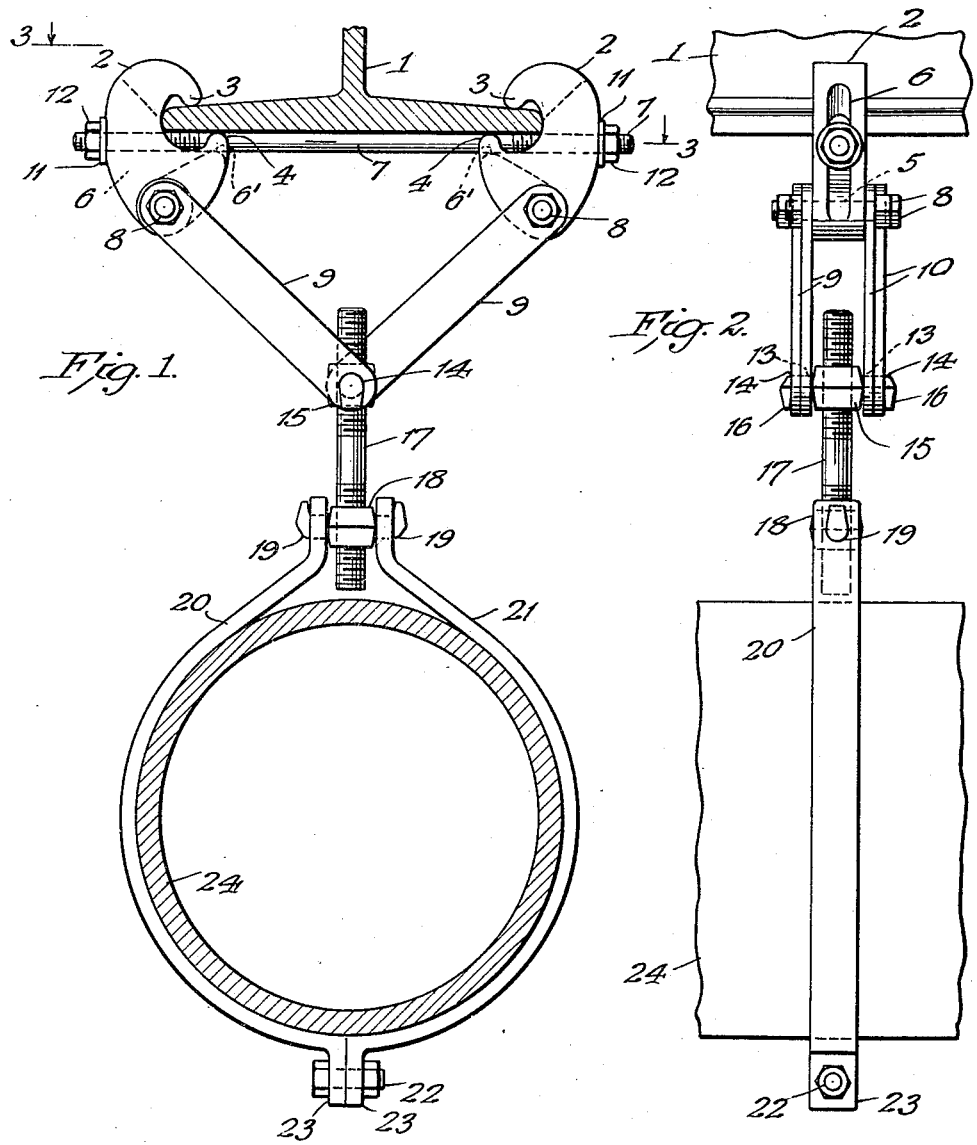
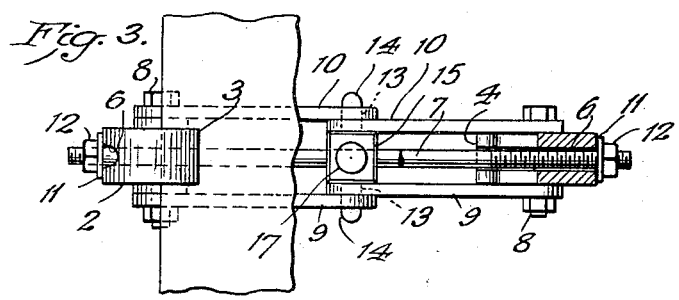
INVENTOR
ALEXIS C. McNULTY.
BY
ATTORNEY

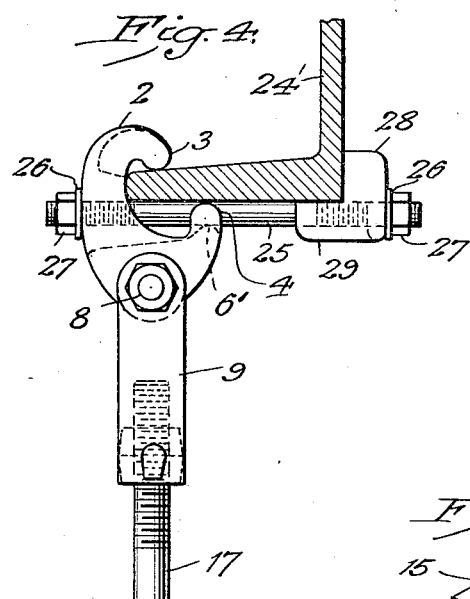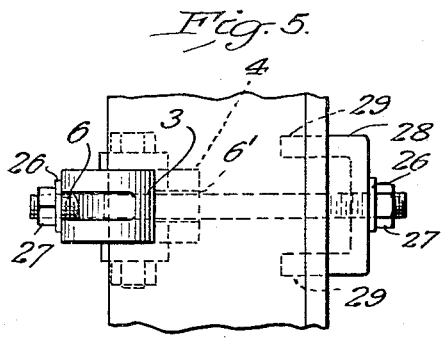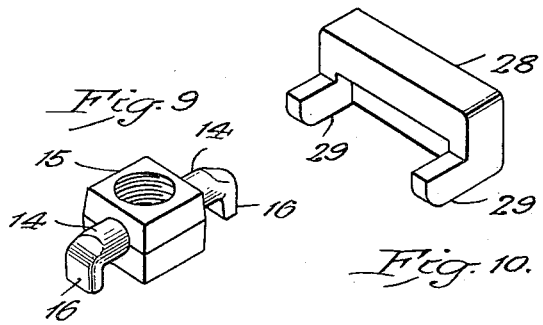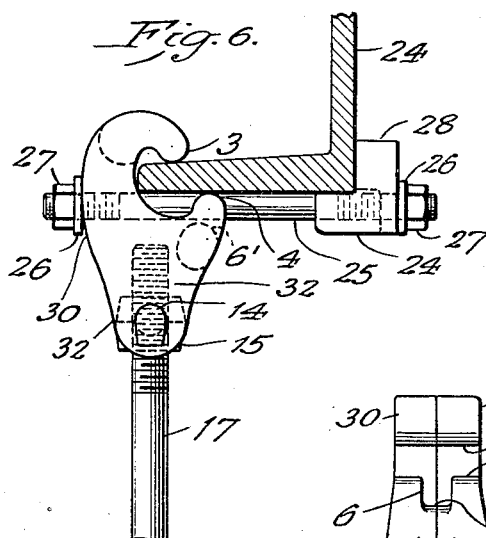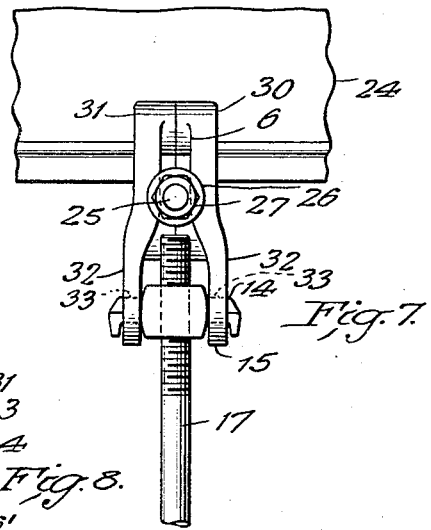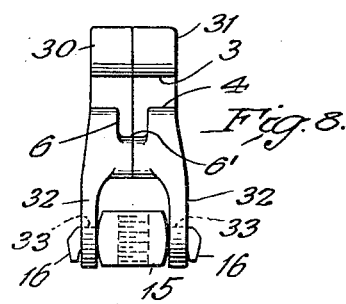

Patented Nov. 17, 1931

1,832,315

UNITED STATES PATENT OFFICE

ALEXIS COPP McNULTY, OF RUTHERFORD, NEW JERSEY

SUPPORTING DEVICE

Application filed October 25, 1930. Serial No. 491,105.

My invention relates to supporting devices such as may be used for supporting pipes, cables, and the like, and constitutes an improvement over the supporting device disclosed in my prior Patent #1,604,590, dated October 26, 1926.

In my prior patent, above referred to, there is disclosed a supporting device which comprises a pair of jaws that are adapted to embrace the support. Each of the jaws is bifurcated at one end so as to provide parallel arms or projections. These arms embrace a block to which they are pivotally secured. The block is bored centrally thereof and is internally threaded. A rod in threaded engagement with the block extends therefrom and has a strap for engaging the object to be supported. The jaws are pivotally secured to the block so that they may be moved toward and from each other to embrace the support therebetween, and they are held in clamping relation to the support by a bolt passing through the jaws.

By my present invention, I provide clamping members which are adapted to receive and clamp a support, the clamping action of the members being dependent upon the weight of the object supported by the supporting device. The clamping members are universal in their application in that they are applicable to various sizes and types of beams.

In accordance with this invention, I provide a clamping member for the supporting device comprising opposed projections which are adapted to receive a support therebetween. The object to be supported is suspended from the clamping member, and means are provided for resolving the weight of the object supported into a plurality of forces acting in different directions and causing the projections of the clamping member to engage opposite surfaces of the support and clamp the support therebetween.

Specifically, I provide a supporting device which comprises a substantially C shaped clamping member which is adapted to receive a support between the opposed projections thereof. Offset from the opposed projections of the clamping member there is a hole through which a bolt extends, and to the bolt links are pivotally secured on either side of the clamping member and extend therefrom. These links engage trunnions extending from two opposed faces of a nut. A rod in threaded engagement with the nut extends therefrom and is provided at its lower end with a similar nut, the trunnions of which are adapted to receive the ends of a strap which may extend around the object to be supported.

By locating the point of suspension from the clamping member to one side of the projections, the weight of the object supported is resolved into a plurality of forces acting in different directions which cause the clamping member to pivot about one of the projections and clamp the support between the projections.

The trunnions on the nut to which the link members are secured are provided with projections extending at right angles to the trunnions. These projections are such that the links may be placed on the trunnions with the projections in place. However, after the links are on the trunnions the projections prevent the links from moving axially with respect to the trunnions and becoming accidentally disengaged from the trunnions.

The invention will be more clearly understood from the following particular description of the embodiments thereof shown in the accompanying drawings, in which:

Fig. 1 is a side elevation of a supporting device constructed in accordance with my invention;

Fig. 2 is an end elevation of the same;

Fig. 3 is a plan of the same, partly in section and taken on the line 3—3 of Fig. 1;

Fig. 4 is a side elevation of a modified form of the supporting device;

Fig. 5 is a plan of the same;

Fig. 6 is a side elevation of a further modified form of my invention;

Fig. 7 is an end elevation of the same;

Fig. 8 is also an end elevation of the same showing the end opposite to that shown in Fig. 7;

Fig. 9 is a perspective of the nut used in the supporting device; and

Fig. 10 is a perspective of an abutment member used in conjunction with the forms of the device shown in Figs. 4 to 8 inclusive.

In Figs. 1 to 3, inclusive, the supporting device is shown as it is applied to an ordinary I-beam 1. In this form of the invention the supporting device comprises two clamping members 2. The clamping members 2 are substantially C shaped, having opposed projections 3 and 4 which are adapted to receive the flange of the I-beam therebetween. The clamping members 2 are substantially wider near the lower end thereof and terminate at their lower extremities in projections through which holes 5 are bored transversely thereof. The axes of the holes 5 are to the rear of the projections 3 and 4 and are contained in diagonal planes passing through the projections 3. The clamping members 2 are also provided with slots 6 through which a bolt 7 is adapted to pass. The slots 6 pass through the projections 4, the bottom of the slot in the projection providing a rest for the bolt 7.

Through the holes 5 in each of the clamping members 2 a bolt 8 extends and pivotally secures links 9 and 10 to opposite sides of the clamping member. From the links 9 and 10 the object to be supported is suspended. By placing the axis of the hole 5 in a diagonal plane through the projections 3, the weight of the object suspended from the links 9 and 10 is resolved into a plurality of forces acting in different directions. Components of the weight of the object supported act to turn the clamping member about the projection 3 as a pivot, the surfaces of the projection 3 being round as shown so that the clamping member may rock about the projection under the influence of these components. The clamping member is thus rocked about the projection 3 until the projection 4 engages the opposite surfaces of the flange of the I-beam and the flange is securely clamped between the projections. By virtue of the fact that the clamping members, as explained immediately above, are caused, under the influence of the weight supported, to rock about the projection 3 as a pivot, it will be obvious that the clamping members will clamp any size beam, the only limitation being that the thickness of the beam or support is such that it will extend between the projections of the clamping member.

The bolt 7, extending through the clamping members 2, is provided to maintain the clamping members in position to embrace and clamp the flanges of the I-beam. The rear of the clamping members are curved so that irrespective of the position of rotation of the clamping members about the projections 3, the rear surfaces of the clamping members will be lateral to the bolt 7 and parallel to the surfaces of the washers 11 and nuts 12 on the bolt. The bolt 7 is held against the lower surface of the I-beam by the base 6' of the slots 6 in the projections 4 of the clamping members.

The ends of the links 9 and 10, opposite to the ends secured to the clamping members, are provided with holes 13 through which trunnions 14 on two opposed faces of a nut 15 extend. The relation of the trunnions to the links is such that the trunnions are free to turn within the links. On the ends of the trunnions there are projections 16 extending at right angles to the trunnions. The projections on the trunnions are so proportioned that the links may be placed over the trunnions with the projections thereon. In assembling the device, the projection is first inserted through the opening 13 in a link and the link is then twisted so that the opening therein is parallel to the axis of the trunnion 14 when the link may be slipped over the trunnion. When in position and secured to the clamping member by the bolt 8, the projections 16 on the trunnions prevent axial movement of the links 9 and 10 with respect to the trunnions and maintain the links in place against accidental displacement. As shown, these projections 16 may be cast integral with the trunnions 14 and thus avoid the necessity of beading over the ends of the trunnions after the links have been assembled on the trunnions.

The nut 15 is internally threaded and engages the end of a threaded rod 17 which extends therefrom. On the lower end of the rod, there is a nut 18 similar to that described above. The trunnions 19 on this nut engage openings in the ends of a strap. The strap consists of two semi-circular pieces 20 and 21 which are secured together at the lower end thereof by a bolt 22 passing through lateral flanges 23 formed on the ends of the two pieces of the strap. This strap passes around the object to be supported, which, in this instance, is shown as a pipe 24.

The upper end of the rod is provided with a right hand thread and the lower end is provided with a left hand thread. Consequently, by rotating the rod the distance between the pipe and the support may be adjusted so that the pipe may be given any desired inclination or level. The rod may be rotated in a simple manner by use of the well known pipe wrench.

In Figs. 4 and 5, I have shown a modified form of the supporting device which is particularly applicable to channel beams. In this form of the supporting device a single clamping member 2 and a single pair of links 9 and 10 are used. The object to be supported is suspended from this pair of links in the same manner as described in connection with the form shown in Figs. 1 to 3, inclusive. The clamping member is maintained in clamping position with respect to a flange of the channel beam 24' by a bolt 25 having washers 26 and nuts 27 on the ends thereof and an abutment member. The abutment member is shown in perspective in Fig. 10 and consists of a plate 28 having lateral projections 29. The plate is adapted to abut against the web of the channel beam 24', the projections extending beneath the flange. The bolt 25 extends through this abutment member and the clamping member. The clamping member is held in position by the bolt 25 which is in turn held in position against the lower surface of the flange of the channel beam by the base 6' of the slot 6 in the projection 4 of the clamping member as hereinbefore explained. The abutment, in conjunction with the bolt, prevents the clamping member from moving out of clamping position with respect to the flange of the channel beam.

In Figs. 6, 7 and 8 a modified form of the supporting device shown in Figs. 4 and 5 is illustrated. In this form, the links 9 and 10 are dispensed with. The clamping member is made in two parts 30 and 31 which may be secured together by rivets. Each of the parts 30 and 31 have a depending projection 32 which forms a bifurcated depending projection when the two parts are secured together. Each of the projections has a hole 33 therethrough through which the trunnions 14 on the nut 15 extend, the trunnions on the nut being placed in the holes before the two parts of the clamping member are secured together. Like the form shown in Figs. 4 and 5 and described above, this form also provides for limited adjustment of the object supported with respect to the support.

From the above description of the embodiments shown in the drawings, it will be apparent to those skilled in the art that I have devised a supporting device which is universal in its application in that it is applicable to any and all types and sizes of beams, and that I have provided a supporting device which firmly clamps the support, the clamping action of the supporting device being proportionate to the weight supported.

It is obvious that various changes may be made in the details of the embodiments shown by those skilled in the art within the principle and scope of my invention as expressed in the appended claims.

I claim:

1. A supporting device comprising a clamping member adapted to embrace a support, a link pivotally secured at one end of said clamping member, a nut pivotally secured to the other end of said link, a rod in threaded engagement with the nut and extending therefrom, and means carried by the rod for attachment to the object to be supported.

2. A supporting device comprising a clamping member adapted to embrace a support, a nut pivotally secured to said clamping member, a rod in threaded engagement with the nut and extending therefrom, and means carried by the rod for attachment to the object to be supported.

3. A supporting device comprising two clamping members adapted to embrace a support, a link pivotally connected at one end to one of said clamping members, a second link pivotally connected at one end to the other of said clamping members, a nut pivotally connected in common to the other ends of said links, a rod in threaded engagement with the nut and extending therefrom, and means carried by the rod for attachment to the object to be supported.

4. A supporting device comprising two clamping members, each clamping member having opposed projections adapted to receive a support therebetween, a link pivotally connected at one end of one of said clamping members, a second link pivotally connected at one end to the other of said clamping members, a nut pivotally connected to both of said links so the clamping members may swing toward and from one another and embrace a support therefor, a bolt extending through said clamping members to hold them in position to embrace a support, a rod in threaded engagement with said nut and extending therefrom, and means carried by the rod for attachment to the object to be supported.

In witness whereof, I hereunto subscribe my signature.

ALEXIS COPP McNULTY.